May 6, 1969            J. C. FAKAN            3,443,128
SUPERCONDUCTING ALTERNATOR
Filed Sept. 14, 1965
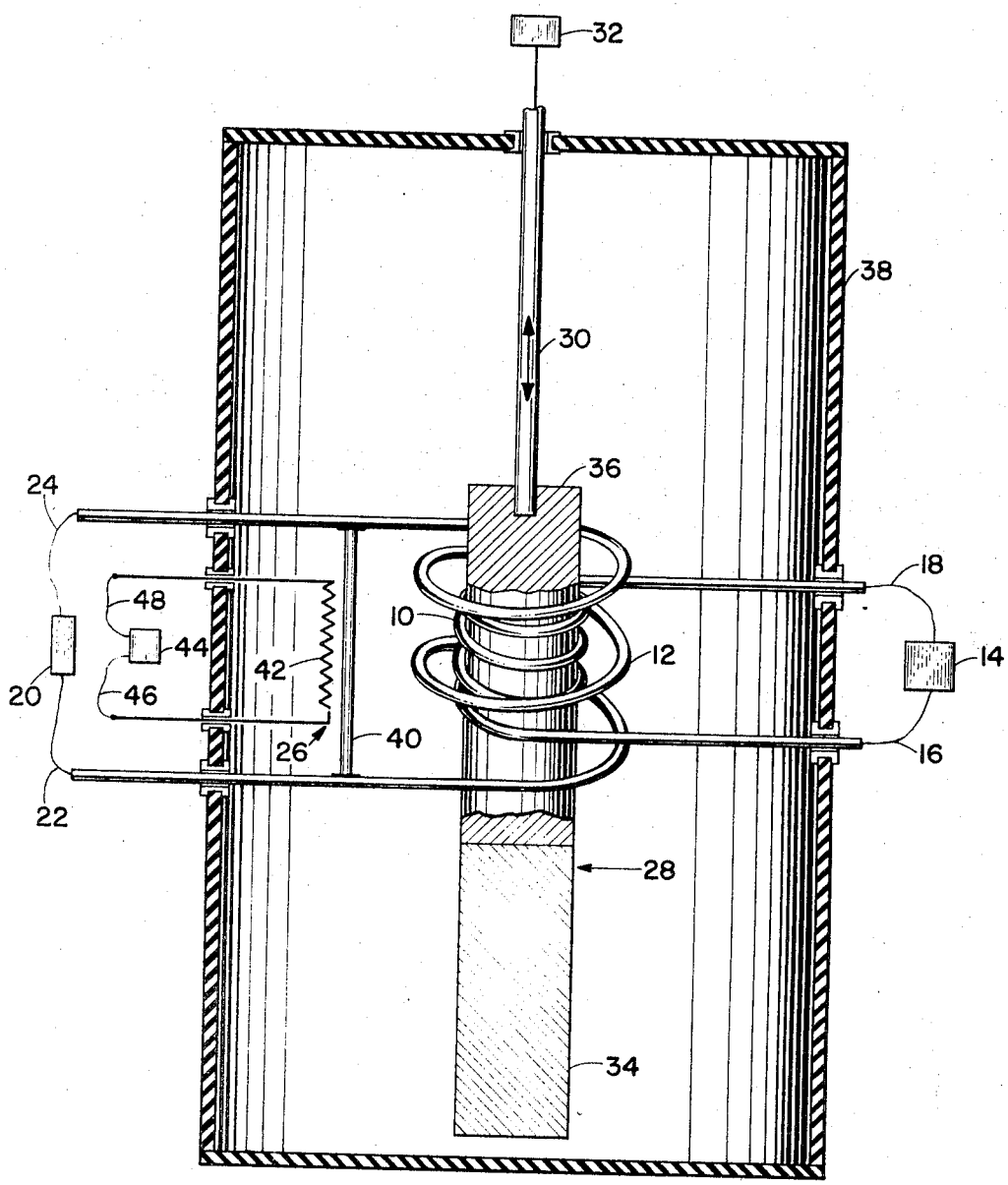
INVENTOR
JOHN C. FAKAN
BY
ATTORNEYS United States Patent Office 3,443,128
Patented May 6, 1969

3,443,128
SUPERCONDUCTING ALTERNATOR
John C. Fakan, North Olmsted, Ohio, assignor to the United States of America as represented by the Administrator of the National Aeronautics and Space Administration
Filed Sept. 14, 1965, Ser. No. 487,343
Int. Cl. H02k 17/00
U.S. Cl. 310—10                                7 Claims

ABSTRACT OF THE DISCLOSURE

An alternator having windings of a superconductive material is cooled below the critical temperature. Actuation of a persistent current switch enables a field winding to be charged whereupon it acts as a permanent magnet. A reciprocating piston alternately places a ferromagnetic material and a diamagnetic material in the center of the alternator to change the magnitude of the field within the output winding thereby causing electrical power to be delivered to the load.

---

The invention described herein may be manufactured and used by or for the Government of the United States of America for governmental purposes without the payment of any royalties thereon or therefor.

This invention is concerned with the conversion of translational, mechanical energy into electrical energy. The invention further relates to an improved alternator which utilizes windings that are cooled below their critical temperature to form superconductors.

Conventional generators and alternators exhibit losses of energy because of the ohmic resistance of the conductors from which they are constructed. These energy losses lower efficiency of the operating of these devices.

An alternator constructed in accordance with the present invention solves this problem of lowered operating efficiency. Such an alternator utilizes superconductive materials which can carry currents without a loss of power thereby enabling high system efficiencies to be realized. The utilization of superconductive materials facilitates the use of more intense or stronger magnetic fields than in conventional devices. Thus, the power density is increased over that obtained in conventional devices.

It is, therefore, an object of the present invention to provide an improved device for production electrical energy.

Another object of the invention is to provide an improved device which converts translational, mechanical energy into electrical energy.

Still another object of the invention is to provide an improved alternator which utilizes superconductive materials for higher operating efficiencies.

These and other objects of the invention will be apparent from the specification which follows and from the drawing wherein like numerals are used throughout to identify like parts.

The drawing is a sectional view of an alternator constructed in accordance with the present invention.

This device comprises an output winding 10 positioned within a field winding 12. Both the windings 10 and 12 have a common center line and are constructed from a superconductive material. However, the output winding 10 may be of a non-superconductive material for certain applications.

The output winding 10 is connected to a load 14 by leads 16 and 18 while the field winding 12 is connected to a suitable power supply 20 through leads 22 and 24. A persistent current switch 26 is connected to the field winding 12.

A piston 28 is mounted on a shaft 30 which is connected to a suitable source of reciprocating motion 32, such as a scotch yoke. The piston 28 has a section 34 which is of a ferromagnetic material and another section 36 of a diamagnetic material.

A container 38 encloses the windings 10 and 12 as well as the piston 28 and the persistent current switch 26. A suitable cryogenic coolant, such as liquid helium, is placed in the container for cooling the superconductive materials below their critical temperatures.

The persistent current switch 26 comprises a shunt 40 of a superconductive material that is connected to opposite ends of the field winding 12. The persistent current switch 26 further includes a resistance heater 42 that is connected to a source of external power 44 by leads 46 and 48.

In operation, the persistent current switch 26 is actuated by supplying current to the resistance heater 42 from the power source 44 through the leads 46 and 48. When the shunt 40 is heated above its critical temperature, the field winding 12 is initially charged from the external power source 20 through the leads 22 and 24.

The power to the resistance heater 42 is then interrupted which allows the shunt 40 to cool below its critical temperature so that it acts as a shunt between the ends of the field winding 12. The power to the field winding 12 through the leads 22 and 24 is then interrupted, and the field winding 12 acts as a permanent magnet because the current flowing through the field winding passes through the shunt 40.

Reciprocation of the piston 28 along the common core of the windings 10 and 12 alternately places the ferromagnetic material and the diamagnetic material in the center of the winding. This changes the magnitude of the field within the output winding thereby causing electrical power to be delivered to the load 14.

While a preferred embodiment of the invention has been shown and described, it will be appreciated that various structural modifications may be made to the alternator without departing from the spirit of the invention or the scope of the subjoined claims. For example, the length of the piston 28 may be shortened to one-half the length shown in the drawing by making the piston entirely of a ferromagnetic or a diamagnetic material if space within the container 30 is a critical factor.

What is claimed is:

1. An electrical generating device comprising:
   a first coil of superconducting material,
   a second coil positioned within said first coil with both said first and second coils having a common center line,
   a persistent current switch connected to said first coil,
   means for cooling said first coil and said persistent current switch below their critical temperatures,
   means for actuating said persistent current switch,
   means for initially charging said first coil upon actuation of said persistent current switch, and
   a movable core mounted within said first and said second coils to change the magnitude of the field within said second coil.

2. An electrical generating device as claimed in claim 1 wherein the movable core comprises a piston having means for reciprocating the same along the common center of the first and second coils.

3. An electrical generating device as claimed in claim 2 wherein the piston has a section of ferromagnetic material.

4. An electrical generating device as claimed in claim 2 wherein the piston has a section of diamagnetic material.

5. An electrical generating device comprising:
   a first coil of superconducting material,
   a second coil positioned within said first coil with both said first and second coils having a common center line, a shunt of superconducting material connected to opposed ends of said first coil, means for cooling said first coil and said shunt below their critical temperatures, means for selectively heating said shunt above its critical temperature, means for initially charging said first coil upon heating said shunt, and a movable core mounted within said first and said second coils to change the magnitude of the field within said second coil subsequent to the initial charging of said first coil.

6. An alternator comprising:

a field coil of superconducting material, a load coil adjacent said field coil, a shunt of superconducting material connected to the ends of said field coil, means for cooling said field coil and said shunt below their critical temperatures, means for selectively heating said shunt above its critical temperature, means for initially charging said field coil upon heating said shunt, and a core having a ferromagnetic section mounted for reciprocation within said field and load coils for changing the magnetic field within said load coil subsequent to the initial charging of said field coil and the cooling of said shunt below its critical temperature.

7. In an alternator of the type having a load coil with a core mounted in the center thereof, the improvement comprising:

a superconducting field coil adjacent the load coil and core having means for passing an electrical charge therethrough, a superconducting member electrically connected to the ends of said field coil for shunting said electrical charge, means for selectively heating said member above its critical temperature whereby said electrical charge is initially directed through said field coil, a section of ferromagnetic material in the core, and means for reciprocating said section of ferromagnetic material in the core subsequent to the cooling of said member below its critical temperature thereby changing the magnitude of the field within the load coil to generate electrical power.

References Cited

UNITED STATES PATENTS

| Re. 25,712 | 1/1965 | Slade | 336—155 |
| 3,150,291 | 9/1964 | Laquer | 317—123 |
| 3,175,405 | 3/1965 | Doyle et al. | 73—517 |

DAVID X. SLINEY, *Primary Examiner.*

U.S. Cl. X.R.

310—15; 323—44; 336—130